US009767609B2

(12) United States Patent
Eade et al.

(10) Patent No.: US 9,767,609 B2
(45) Date of Patent: Sep. 19, 2017

(54) MOTION MODELING IN VISUAL TRACKING

(71) Applicant: Microsoft Technology Licensing, LLC, Redmond, WA (US)

(72) Inventors: Ethan Eade, Seattle, WA (US); Michael John Ebstyne, Seattle, WA (US); Frederick Schaffalitzky, Bellevue, WA (US); Drew Steedly, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 131 days.

(21) Appl. No.: 14/179,384

(22) Filed: Feb. 12, 2014

(65) Prior Publication Data

US 2015/0228118 A1 Aug. 13, 2015

(51) Int. Cl.
*G06T 19/00* (2011.01)
*G06F 3/01* (2006.01)
*G02B 27/01* (2006.01)

(52) U.S. Cl.
CPC .......... *G06T 19/006* (2013.01); *G02B 27/017* (2013.01); *G06F 3/012* (2013.01); *G06F 3/013* (2013.01); *G06F 3/017* (2013.01); *G02B 2027/0178* (2013.01)

(58) Field of Classification Search
CPC .................................................... G06T 19/006
See application file for complete search history.

(56) References Cited

U.S. PATENT DOCUMENTS

| 5,742,264 | A | 4/1998 | Inagaki et al. |
| 7,940,957 | B2 | 5/2011 | Ikenoue et al. |
| 2004/0051680 | A1* | 3/2004 | Azuma et al. ..................... 345/8 |
| 2006/0089786 | A1* | 4/2006 | Soehren ........................ 701/200 |
| 2007/0276590 | A1* | 11/2007 | Leonard .............. G01C 21/005 701/468 |
| 2011/0234840 | A1 | 9/2011 | Klefenz et al. |
| 2012/0075343 | A1 | 3/2012 | Chen et al. |
| 2012/0214594 | A1 | 8/2012 | Kirovski et al. |
| 2012/0327116 | A1 | 12/2012 | Liu et al. |
| 2013/0174213 | A1 | 7/2013 | Liu et al. |
| 2015/0125045 | A1* | 5/2015 | Gauglitz ............... G06T 7/2033 382/107 |

OTHER PUBLICATIONS

ISA European Patent Office, International Search Report and Written Opinion Issued in Application No. PCT/US2015/014531, May 11, 2015, WIPO, 9 Pages.

(Continued)

*Primary Examiner* — Jeffrey A Brier
(74) *Attorney, Agent, or Firm* — Alleman Hall Creasman & Tuttle LLP

(57) ABSTRACT

Embodiments are disclosed that relate to determining a pose of a device. One disclosed embodiment provides a method comprising receiving sensor information from one or more sensors of the device, and selecting a motion-family model from a plurality of different motion-family models based on the sensor information. The method further comprises providing the sensor information to the selected motion-family model and outputting an estimated pose of the device according to the selected motion-family model.

20 Claims, 5 Drawing Sheets

(56) References Cited

OTHER PUBLICATIONS

Dorfmuller-Ulhaas, Klaus, "Robust Optical User Motion Tracking Using a Kalman Filter", 10th ACM Symposium on Virtual Reality Software and Technology, May 2003, 10 pages.

Isard, Michael et al., "A Mixed-State Condensation Tracker with Automatic Model-Switching", Sixth International Conference on Computer Vision, Jan. 1998, 6 pages.

Klein, Georg et al., "Parallel Tracking and Mapping for Small AR Workspaces", 6th IEEE and ACM International Symposium on Mixed and Augmented Reality, Nov. 2007, 10 pages.

LaViola Jr., Joseph J., "A Testbed for Studying and Choosing Predictive Tracking Algorithms in Virtual Environments", Proceedings of the Workshop on Virtual Environments, May 2003, 10 pages.

"Understanding Predictive Tracking and Motion Estimation Algorithms in Virtual Environments", Interactive Systems & User Experience Research Cluster of Excellence, http://www.eecs.ucf.edu/isuelab/research/motion.php, Available as early as Sep. 20, 2013, 3 pages.

Strelow, D. et al., "Motion Estimation from Image and Inertial Measurements," The International Journal of Robotics Research, vol. 23, No. 12, Dec. 2004, 39 pages.

\* cited by examiner

MOTION MODELING IN VISUAL TRACKING

BACKGROUND

Augmented reality experiences may be provided by presenting images to a user via a head-mounted display device, the images overlaying at least a portion of a real-world environment viewed by the user. One or more features of the augmented reality experience may be affected by a changing perspective of the head-mounted display device. The changing perspective may be detected by one or more sensors of the head-mounted display device, but each sensor may suffer from noise.

SUMMARY

Embodiments are disclosed for performing visual tracking and mapping to determine a pose of a device. In one embodiment, a method of assessing a pose of a device includes receiving sensor information from one or more sensors of the device, selecting a motion-family model from a plurality of different motion-family models based on the sensor information, and providing the sensor information to the selected motion-family model. The method further includes outputting an estimated pose of the device according to the selected motion-family model. Utilizing a motion-family model may enable the determination of the estimated pose to account for different types of movement that may be associated with a physical state of a user-worn device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Augmented and/or mixed reality experiences may be provided by a head-mounted display (HMD) device via one or more displays of the HMD. In order to achieve an augmented reality experience that is properly aligned to a real-world environment of a wearer of the HMD, movements of the wearer may be accounted for when determining displayed content. A comfortable viewing experience may also be provided by ensuring that noise and/or jitter of display output is controlled (e.g., a level of smoothing is determined) based on detected/collected movements of the device and a physical state (e.g., pose and/or movement) of the wearer/HMD.

Figure 1:
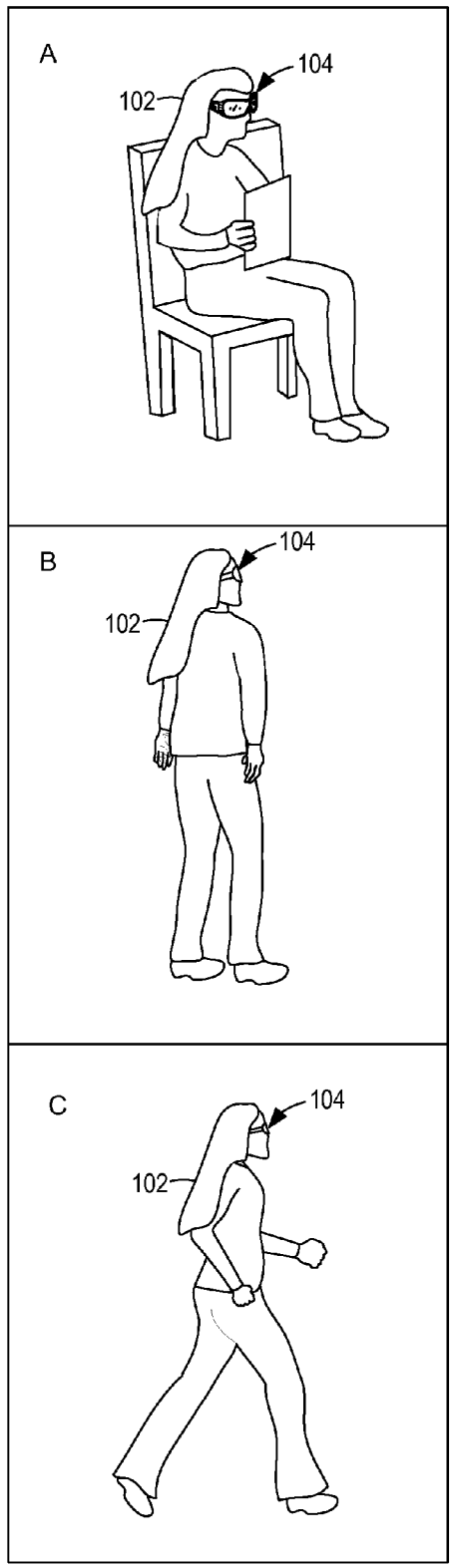
FIG. 1 shows a wearer of a head-mounted display device in different physical states in accordance with an embodiment of the present disclosure.
Figure 1:
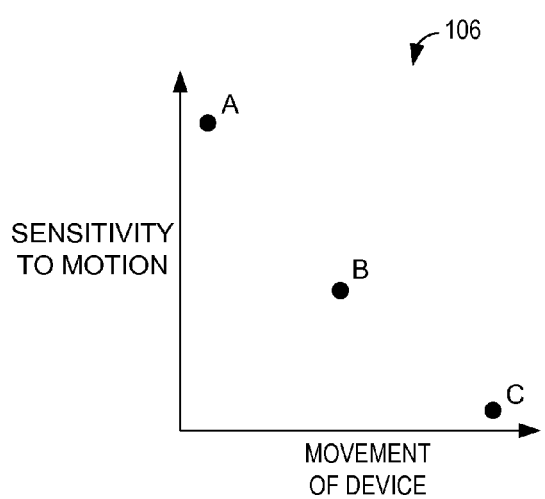

FIG. 1 illustrates a wearer 102 of a head-mounted display device 104 in various physical states. As shown in the exemplary plot 106, a wearer's sensitivity to motion and/or noise on the display device may change relative to a type of movement of the device. For example, in box A, the wearer 102 is sitting and performing a reading action. Head movements in such a physical state may be characterized by subtle oscillations responsive to breathing, horizontal/vertical movements responsive to directing a gaze at the reading material, and other natural head movements that correspond to the wearer fidgeting, reacting to environmental stimulus, adjusting a sitting position, etc.

In box B, the wearer 102 is standing in a substantially stationary position. Head movements in this physical state may be more pronounced than those experienced during sitting, as the stability of the wearer may be lower when relying solely on the support of two legs. However, if the wearer 102 is not reading while standing, the horizontal/vertical head movements expected while in the physical state represented in box A may not be expected while in the physical state represented in box B. However, the wearer 102 may be more likely to initiate lateral movement in the state of box B compared to the state of box A.

Box C represents a physical state of the wearer 102 including sustained movement of the wearer through a real-world environment. For example, Box C may represent a user walking, running, and/or performing a physical activity. Accordingly, the physical state represented in Box C may result in the most pronounced movement of the HMD 104 relative to the movement experienced by the HMD 104 in the states represented by boxes A and B. As shown in the plot 106, as the amount of movement of the HMD/wearer increases, the wearer's sensitivity to motion and/or noise of displayed content may decrease. It is to be understood that the plotted points are representative, and a relationship between the movement and sensitivity under the different physical states may be correlated in another manner that is different from a linear relationship.

Displayed content on the HMD 104 may include information that does not have any relationship to a location of elements in the real-world environment (e.g., body locked content). The displayed content may also include information and/or objects that are positioned on the display device in locations that are based on the real-world environment (e.g., world locked content). Thus, movement of the HMD 104 may result in movement of displayed content relative to the wearer that is selected based on motion data captured/received by the HMD 104. In this way, display properties of displayed content (e.g., updates to positions of the displayed content) may be adjusted based on the motion data describing movement of the HMD.

The correlation between a wearer's sensitivity to movement/noise and the measureable movement of the device may be used to define a functional relationship between these parameters and motion data processing. For example, the HMD may process motion data with less smoothing during higher levels of movement (e.g., while a wearer is performing a physical activity such as walking or running). The HMD may further exhibit faster response times and increased accuracy when processing motion data during such higher levels of movement. In this way, the positioning and/or other features of the displayed content may be accurately mapped to the changing locations of the real-world environment viewable through the HMD as the HMD and wearer move through the real-world environment. Conversely, the HMD may smooth motion data more heavily when a wearer may be more sensitive to movement/noise exhibited while presenting displayed content (e.g., during lower levels of movement in which the wearer is reading, sitting, lying down, etc.).

Further adjustments may be made to motion data detected/received at the HMD based on the activity performed by the wearer and the relationship of that activity to expected trajectories/families of movements. For example, while reading, exaggerated head movements and/or substantial lateral movements may be unexpected, thus isolated motion data corresponding to such movements may be determined to be noisy/invalid and adjusted accordingly.

Figure 2:
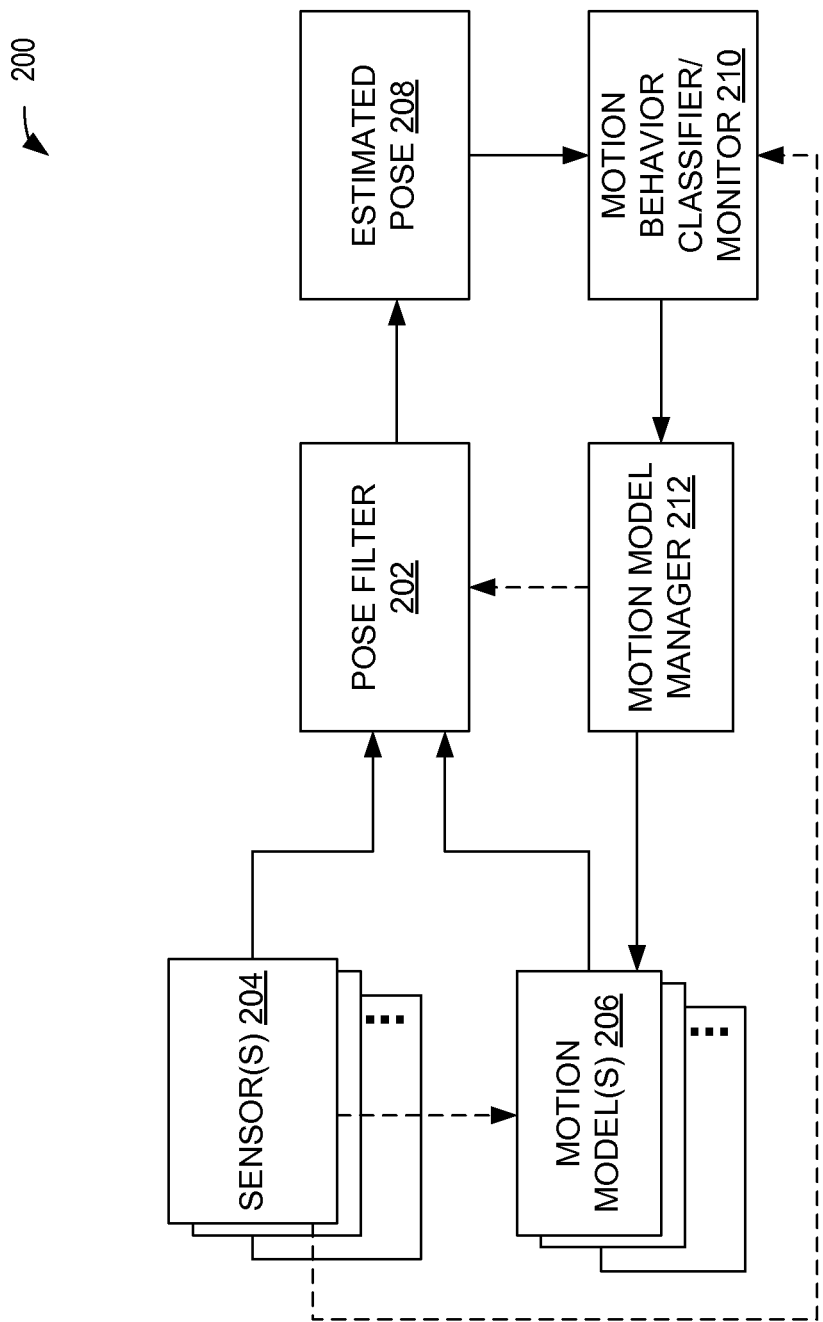
FIG. 2 is a block diagram of a motion tracker of a head-mounted display device in accordance with an embodiment of the present disclosure.

In order to analyze and/or adjust motion data received by a head-mounted display device (e.g., HMD 104), a visual tracking system, such as the visual tracking system 200 of FIG. 2 may be included in the HMD. The visual tracking system 200 may include a pose filter 202 that receives inputs from one or more sensors 204 communicatively connected to the HMD. As discussed in more detail below with respect to FIG. 5, the sensors 204 may include any suitable number and/or combination of sensors for determining a position, orientation, and/or other movement characteristics of the HMD. A selected motion model of the plurality of motion-family models 206 may be applied to the sensor information from the sensors 204 in order to interpret the sensor information in a manner that is consistent with a family of motion associated with the HMD. For example, families of motion may include acceleration profiles, such as a constant acceleration of the HMD over a short period of time having different random walks applied thereto, whereby each of the random walks define a different estimated next pose (e.g., position and orientation) of the HMD based on the previous pose/sensor information. The sensor information may be provided to the selected motion-family model and the selected motion-family model output (e.g., based on the sensor information) may be provided to the pose filter 202 in some embodiments. In additional or alternative embodiments, the selected motion-family model may be provided to the pose filter 202 alongside of the sensor information such that the sensor information may be applied to the motion-family model within the pose filter 202.

The motion-family models 206 may include mathematical models that characterize a type of motion of the HMD and/or a head of the wearer of the HMD. The motion-family models 206 may receive sensor information and output altered sensor information adjusted to match expected motion of the HMD and/or head of the wearer based on the family of motion associated with a selected motion-family model. For example, the motion-family model may match one or more measurements indicating head movement to a selected trajectory of head movement based on the physical state of the wearer. Based on the information from the selected motion-family model, the pose filter 202 may output an estimated pose 208 of the HMD.

Different user scenarios (e.g., physical states of the wearer of the HMD) may benefit from different motion-family models. For example, as described above, sensor information may be interpreted differently in order to achieve a comfortable viewing experience for the wearer given the activity, position, orientation, and/or movement of the wearer. Determining wearer activities may include determining if the wearer is reading (which may include viewing displayable content such as images or videos) vs. not reading. Determining positions/orientations/movements of the wearer may include determining if the wearer is crawling, sitting, running, laying down, etc., determining the speed/acceleration of movement of the wearer, and/or determining physical features of the wearer, such as length of the neck, legs, back, etc. of the wearer. The physical state of the wearer may be determined based upon the sensor information and/or the estimated pose 208 of the HMD.

As the physical state of the wearer may change over time, the motion-family model that is associated with the physical state may likewise change. Accordingly, the sensor information and/or a current/previously-output estimated pose 208 may be provided to a motion behavior classifier 210, which may analyze the received information and select a motion-family model appropriate for a family of motion associated with the received information. For example, the sensor information may be provided to the motion behavior classifier 210 simultaneously with the pose filter 202 in order to ensure a timely selection of a motion-family model. The motion behavior classifier may send an indication of the selected motion-family model to a motion model manager 212. The motion model manager 212 may compare the selected motion-family model to a currently-used motion-family model, and if the selected motion-family model differs from the currently-used motion-family model, change the currently-used motion-family model to the selected motion-family model. For example, the motion model manager 212 may instruct the pose filter 202 to utilize the selected motion-family model in place of the currently-used motion-family model when determining a next estimated pose of the HMD.

In some embodiments, the pose filter 202 may include a Kalman filter for continuous estimation of the pose of the HMD based upon measurements from different sensors observed over time. For example, if a change in a motion-family model is instructed by the motion behavior classifier 210, a time-varying pose estimate may be output from the pose filter 202 that is based on both the current/previously-used motion-family model and the selected motion-family model. In such an example, a first, earlier time-varying pose estimate may be based on the current/previously-used motion-family model and a second, later time-varying pose estimate (e.g., that is output after the first estimate) may be based on an average of an output of the current/previously-used motion-family model and the selected motion-family model.

Figure 3:
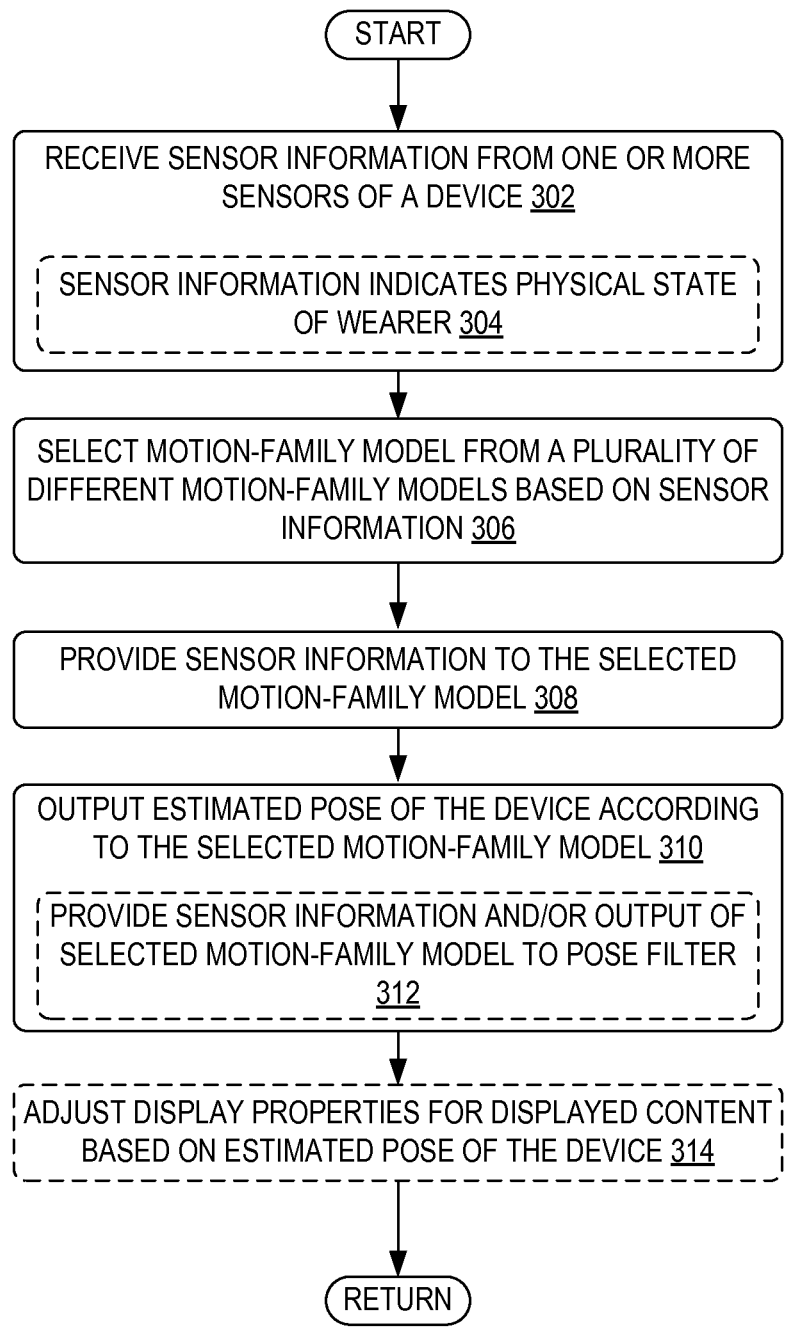
FIG. 3 is a flow chart of a method for determining an estimated pose of a device in accordance with an embodiment of the present disclosure.

FIG. 3 is a flow chart of a method 300 for determining an estimated pose of a device, such as HMD 104 of FIG. 1. The method 300 may be performed by a visual tracking system, such as visual tracking system 200 of FIG. 2. At 302, the method 300 includes receiving sensor information from one or more sensors of a device. The sensor information may indicate a physical state of a wearer of the device, as indicated at 304. At 306, the method 300 includes selecting a motion-family model from a plurality of different motion-family models based on sensor information. For example, as described above with respect to FIG. 2, the motion-family model may be a mathematical model including coefficients that are optimized for a particular family of motion that may be used to determine an estimated pose of the device based on the sensor information. As indicated at 308, the method 300 includes providing the sensor information to the selected motion-family model. The selected motion-family model may adjust the sensor information based on the families of motion associated with that motion-family model. For example, the motion-family model may provide a particular level of smoothing to the sensor information based on the type of motion that is expected, given the family of motion associated with the motion-family model.

At 310, the method 300 includes outputting an estimated pose of the device according to the selected motion-family model. For example, the estimated pose may be output from a pose filter, and the method may include providing the sensor information and/or the output of the selected motion-family model to the pose filter, as indicated at 312. The method 300 may include adjusting display properties for displayed content based on the estimated pose of the device, as indicated at 314. For example, the location and/or appearance of the displayed content may be adjusted based upon the estimated pose of an HMD in order to maintain a defined relationship between the location of real-world objects as viewed through the HMD and the location of displayed content.

Figure 4:
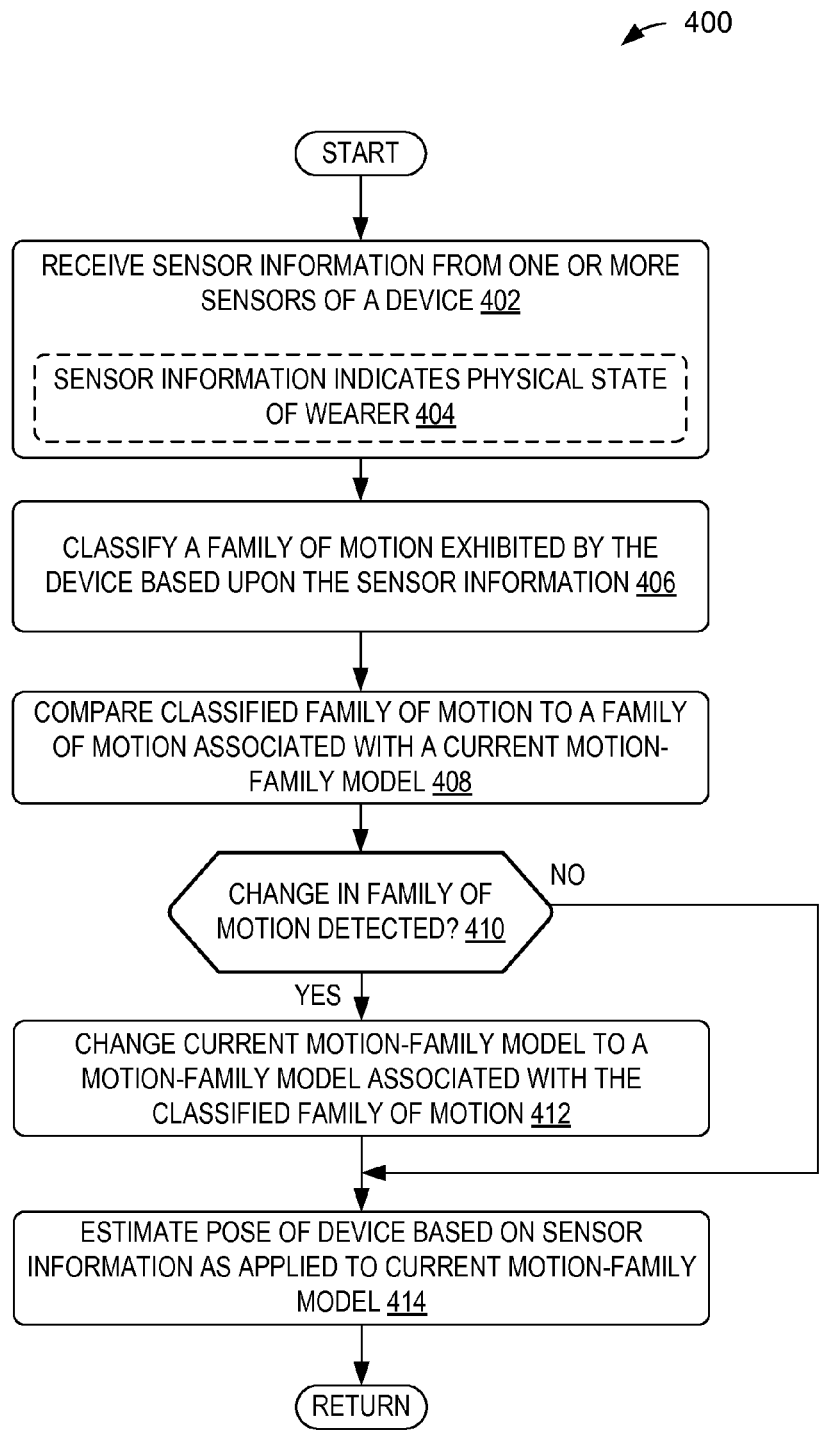
FIG. 4 is a flow chart of a method for selecting a motion-family model for estimating a pose of a device in accordance with an embodiment of the present disclosure.

FIG. 4 is a flow chart of a method 400 for selecting a motion-family model for estimating a pose of a device, such as the HMD 104 of FIG. 1. For example, the method 400 may be performed by a visual tracking system of an HMD, such as the visual tracking system 200 of FIG. 2. At 402, the method 400 includes receiving sensor information from one or more sensors of a device. As described above with respect to FIG. 3, the sensor information may indicate a physical state of the wearer of the device, as indicated at 404. At 406, the method 400 includes classifying a family of motion exhibited by the device based upon the sensor information. For example, the family of motion may correspond to head motions expected from a wearer in the physical state detected at 404. The method 400 includes comparing the classified family of motion to a family of motion associated with a current motion-family model, such as a current motion-family model being utilized by the visual tracking system to estimate a pose of the device.

At 410, the method 400 includes determining if a change in the family of motion is detected based upon the comparison of 408. If a change in motion is detected (e.g., "YES" at 410), the method proceeds to 412 to change the current motion-family model to a motion-family model associated with the classified family of motion. Future estimated poses that are determined after the change in family of motion is detected may be based on a new motion-family model and/or a combination of the new motion-family model and the current motion-family model, as indicated at 414. If a change in the family of motion is not detected (e.g., "NO" at 410), the method 400 may proceed directly to 414 to estimate the pose of the device based on the sensor information as applied to the current motion-family model—without changing the motion-family model.

Figure 5:
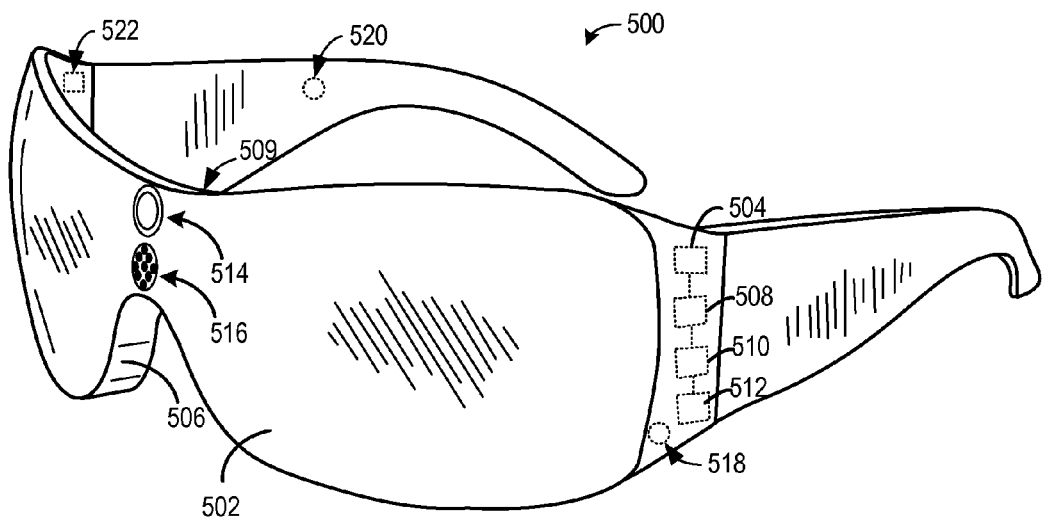
FIG. 5 shows an example of a head-mounted display device in accordance with an embodiment of the present disclosure.

With reference now to FIG. 5, one example of an HMD device 500 in the form of a pair of wearable glasses with a transparent display 502 is provided. It will be appreciated that in other examples, the HMD device 500 may take other suitable forms in which a transparent, semi-transparent, and/or non-transparent display is supported in front of a viewer's eye or eyes. It will also be appreciated that the HMD device 104 shown in FIG. 1 may take the form of the HMD device 500, as described in more detail below, or any other suitable HMD device.

The HMD device 500 includes a display system 504 and transparent display 502 that enables images such as holographic objects to be delivered to the eyes of a wearer of the HMD. The transparent display 502 may be configured to visually augment an appearance of a physical environment to a wearer viewing the physical environment through the transparent display. For example, the appearance of the physical environment may be augmented by graphical content (e.g., one or more pixels each having a respective color and brightness) that is presented via the transparent display 502 to create a mixed reality environment.

The transparent display 502 may also be configured to enable a user to view a physical, real-world object in the physical environment through one or more partially transparent pixels that are displaying a virtual object representation. As shown in FIG. 5, in one example the transparent display 502 may include image-producing elements located within lenses 506 (such as, for example, a see-through Organic Light-Emitting Diode (OLED) display). As another example, the transparent display 502 may include a light modulator on an edge of the lenses 506. In this example the lenses 506 may serve as a light guide for delivering light from the light modulator to the eyes of a user. Such a light guide may enable a user to perceive a 3D holographic image located within the physical environment that the user is viewing, while also allowing the user to view physical objects in the physical environment, thus creating a mixed reality environment.

The HMD device 500 may also include various sensors and related systems. For example, the HMD device 500 may include a gaze tracking system 508 that includes one or more image sensors configured to acquire image data in the form of gaze tracking data from a user's eyes. Provided the user has consented to the acquisition and use of this information, the gaze tracking system 508 may use this information to track a position and/or movement of the user's eyes.

In one example, the gaze tracking system 508 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the gaze tracking system 508 may then determine a direction the user is gazing. The gaze tracking system 508 may additionally or alternatively determine at what physical or virtual object the user is gazing. Such gaze tracking data may then be provided to the HMD device 500.

It will also be understood that the gaze tracking system 508 may have any suitable number and arrangement of light sources and image sensors. For example and with reference to FIG. 5, the gaze tracking system 508 of the HMD device 500 may utilize at least one inward facing sensor 509.

The HMD device 500 may also include sensor systems that receive physical environment data from the physical environment. For example, the HMD device 500 may also include a head tracking system 510 that utilizes one or more motion sensors, such as motion sensors 512 on HMD device 500, to capture head pose data and thereby enable position tracking, direction and orientation sensing, and/or motion detection of the user's head. Accordingly and as described in more detail above, the pose filter 202 of FIG. 2 may receive head pose data as sensor information that enables the pose of the HMD device 500 to be estimated.

In one example, head tracking system 510 may comprise an inertial measurement unit configured as a three-axis or three-degree of freedom position sensor system. This example position sensor system may, for example, include three gyroscopes to indicate or measure a change in orientation of the HMD device 500 within 3D space about three orthogonal axes (e.g., x, y, z) (e.g., roll, pitch, yaw). In another example, head tracking system 510 may comprise an inertial measurement unit configured as a six-axis or six-degree of freedom position sensor system. This example position sensor system may, for example, include three accelerometers and three gyroscopes to indicate or measure a change in location of the HMD device 500 along the three orthogonal axes and a change in device orientation about the three orthogonal axes.

Head tracking system 510 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including but not limited to any number of gyroscopes, accelerometers, inertial measurement units (IMUs), GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples the HMD device 500 may also include an optical sensor system that utilizes one or more outward facing sensors, such as optical sensor 514 on HMD device 500, to capture image data. The outward facing sensor(s) may detect movements within its field of view, such as gesture-based inputs or other movements performed by a user or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 516. It will be appreciated that any other suitable depth camera may be used within the scope of the present disclosure.

The outward facing sensor(s) may capture images of the physical environment in which a user is situated. With respect to the HMD device 500, in one example a mixed reality display program may include a 3D modeling system that uses such captured images to generate a virtual environment that models the physical environment surrounding the user.

The HMD device 500 may also include a microphone system that includes one or more microphones, such as microphone 518 on HMD device 500, that capture audio data. In other examples, audio may be presented to the user via one or more speakers, such as speaker 520 on the HMD device 500.

The HMD device 500 may also include a controller, such as controller 522 on the HMD device 500. The controller may include a logic machine and a storage machine, as discussed in more detail below with respect to FIG. 6, that are in communication with the various sensors and systems of the HMD device and display. In one example, the storage subsystem may include instructions that are executable by the logic subsystem to receive signal inputs from the sensors, determine a pose of the HMD device 500, and adjust display properties for content displayed on the transparent display 502.

The present disclosure provides a visual tracking system that models detected motion of a device using motion-family models based on sensor information in order to determine an estimated pose of the device. Utilizing models that are selected based on detected pose/movement information associated with a wearer of the device mitigates the trade-offs between stability and accuracy provided by the different motion-family models by selecting the model that is appropriate for the way in which the device is being used (e.g., whether the wearer is reading while sitting still, playing a game while moving, etc.).

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
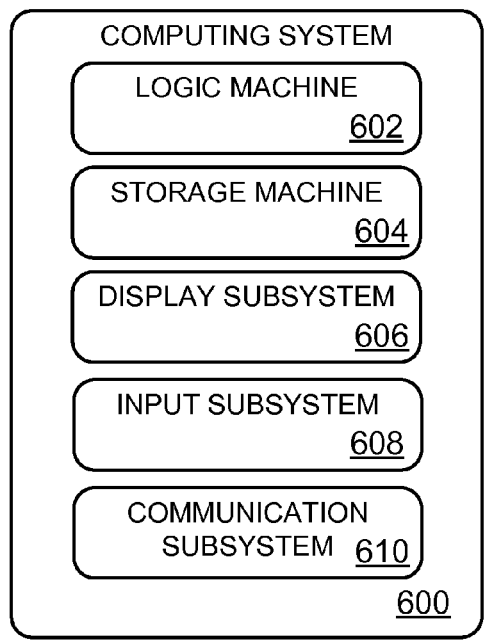
FIG. 6 shows an example of a computing system in accordance with an embodiment of the present disclosure.

FIG. 6 schematically shows a non-limiting embodiment of a computing system 600 that can enact one or more of the methods and processes described above. Computing system 600 is shown in simplified form. Computing system 600 may take the form of one or more head-mounted display devices, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold machine-readable instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology, such as displays 502 of the HMD 500 illustrated in FIG. 5. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; electric-field sensing componentry for assessing brain activity; any of the sensors described above with respect to head tracking system 510 of FIG. 5; and/or any other suitable sensor.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of assessing a pose of a device, the method comprising:

receiving, from one or more sensors of the device, sensor information including a change in location of the device along three orthogonal axes and a change in orientation of the device along the three orthogonal axes;

using a pre-configured motion behavior classifier to determine a physical state of a user of the device based on the change in location of the device and the change in orientation of the device;

selecting a motion-family model from a plurality of different pre-configured motion-family models based on the physical state of the user;

providing the sensor information to the selected motion-family model;

receiving an estimated pose of the device from the selected motion-family model, wherein the selected motion-family model interprets the sensor information in accordance with a family of motion associated with the device for the selected motion-family model, the family of motion including an acceleration profile for the device, and the selected motion-family model matching one or more measurements of the device to a selected trajectory of the device; and displaying content on the device based on the estimated pose of the device.

2. The method of claim 1, wherein the device is a head-mounted display device configured to output the displayed content to a wearer of the device, the displayed content being mapped, based on the estimated pose, to changing locations of a real-world environment viewable through the head-mounted display device as the location and orientation of the head-mounted display device changes.

3. The method of claim 2, further comprising adjusting one or more display properties for the displayed content based on the estimated pose of the device.

4. The method of claim 1, wherein outputting the estimated pose of the device further comprises providing the sensor information and an output of the selected motion-family model to a pose filter and outputting the estimated pose of the device from the pose filter.

5. The method of claim 1, wherein the sensor information indicates a physical state of a wearer of the device, the physical state indicating one or more of a position, orientation, and movement characteristic of the wearer.

6. The method of claim 1, wherein selecting the motion-family model comprises classifying a family of motion exhibited by the device and comparing the classified family of motion to one or more families of motion associated with the plurality of different pre-configured motion-family models.

7. The method of claim 6, wherein classifying the family of motion exhibited by the device comprises determining the family of motion based on a previously-output estimated pose of the device.

8. A head-mounted display device comprising:
a sensor;
a logic machine; and
a storage machine, the storage machine holding instructions executable by the logic machine to:
receive, from the sensor, sensor information including a change in location of the head-mounted display device along three orthogonal axes and a change in orientation of the head-mounted display device along the three orthogonal axes;
use a pre-configured motion behavior classifier to determine a physical state of a user of the head-mounted display device based on the change in location of the head-mounted display device and the change in orientation of the head-mounted display device;
select a motion-family model from a plurality of pre-configured motion-family models based on the physical state of a wearer of the head-mounted display device, each of the plurality of pre-configured motion-family models associated with a respective family of motion for the device, each respective family of motion including a different acceleration profile, and each pre-configured motion-family model matching one or more measurements of the sensor to a different trajectory of head movement indicating predefined expected movement of the head-mounted display device for the associated physical state of the user;
provide the sensor information and an output of the selected motion-family model to a pose filter;
output, from the pose filter, an estimated position and orientation of the head-mounted display device based on the sensor information and the selected motion-family model; and
display content on the head-mounted display device based on the estimated pose of the head-mounted display device.

9. The head-mounted display device of claim 8, wherein the physical state of the wearer is determined based on the sensor information from the sensor.

10. The head-mounted display device of claim 8, wherein the sensor information includes one or more measurements of a position and/or orientation of a head of the wearer.

11. The head-mounted display device of claim 10, wherein the motion-family model matches the one or more measurements to a selected trajectory of head movement based on the physical state of the wearer.

12. The head-mounted display device of claim 8, wherein the pose filter includes a Kalman filter.

13. The head-mounted display device of claim 8, wherein selecting the motion-family model from the plurality of pre-configured motion-family models further comprises sending the sensor information and a previously-output estimated position and orientation to a pre-configured motion behavior classifier of the head-mounted display device.

14. The head-mounted display device of claim 13, wherein the sensor information is provided to the pose filter and the pre-configured motion behavior classifier.

15. The head-mounted display device of claim 13, wherein the pre-configured motion behavior classifier is used to analyze the sensor information and the previously-output estimated position and orientation to select the motion-family model.

16. The head-mounted display device of claim 15, further comprising changing the motion-family model if the selected motion-family model is different than a current motion-family model.

17. A hardware memory device holding instructions executable by a logic machine to:
collect sensor information from one or more sensors of a head-mounted display;
send the sensor information to a pre-configured motion behavior classifier for determining a selected motion-family model from a plurality of different pre-configured motion-family models based on the sensor information;
in response to determining that the selected motion-family model is different than a previously-used motion-family model, replace the previously-used motion-family model with the selected motion-family model;
wherein each of the previously-used motion-family model and the selected motion-family model is used to adjust the sensor information to match one or more measurements indicating head movement to a selected trajectory of head movement for that motion-family model;
receive a time-varying pose estimate that is output based on an output of both the previously-used motion-family model and the selected motion-family model; and
display content on the head-mounted display based on the time-varying pose estimate of the head-mounted display.

18. The hardware memory device of claim 17, wherein a first, earlier time-varying pose estimate is based on the previously-used motion-family model and a second, later time-varying pose estimate is based on the selected motion-family model.

19. The hardware memory device of claim 17, wherein a first, earlier time-varying pose estimate is based on the previously-used motion-family model and a second, later time-varying pose estimate is based on an average of an output of the previously-used motion-family model and the selected motion-family model.

20. The hardware memory device of claim 17, wherein one or more of the sensor information and the time-varying pose estimate is provided to a Kalman filter.

\* \* \* \* \*